United States Patent Office  3,390,148
Patented June 25, 1968

3,390,148
NOVEL THIAZINE AND THIAZOLINE
ANTHELMINTIC AGENTS
William C. Austin, Bishops Stortfield, England, Lloyd H.
Conover, Quaker Hill, and James W. McFarland, Lyme,
Conn., and Derek H. Morgan, Littlebourne, near Canterbury, England, assignors to Chas. Pfizer & Co., Inc.,
New York, N.Y., a corporation of Delaware
No Drawing. Filed July 28, 1965, Ser. No. 475,555
13 Claims. (Cl. 260—240)

ABSTRACT OF THE DISCLOSURE

A series of 2-[W-(2-thienyl)alkyl]-, 2-[2-(2-thienyl)vinyl]-, and the corresponding isomeric 3-thienyl derivatives of thiazoline and 5,6-dihydro-4H-1,3-thiazine and the non-toxic acid addition salts thereof as agents for the control of helminthiasis, and methods for their preparation.

This invention relates to a series of novel cyclic thioimidates and their non-toxic acid addition salts which are especially useful as anthelmintic agents. More particularly, it relates to 2-[w-(2-thienyl)alkyl]-, 2-[2-(2-thienyl)vinyl]-, and the corresponding 3-thienyl derivatives of thiazoline, 5,6-dihydro-4H-1,3-thiazine and the non-toxic acid addition salts thereof as agents for the control of helminthiasis.

Helminthiasis, the infestation of the animal body, and particularly the gastrointestinal tract, by various species of parasitic worms, is perhaps the most common, most serious and most widespread disease in the world today. Although the economic significance of this disease has led to extensive research for new and more effective anthelmintics, the countermeasures developed to date have not been entirely satisfactory for one or more reasons; e.g., poor therapeutic index, specificity of action, high cost, low activity, limited anthelmintic spectrum.

According to the present invention it has now been found that a series of novel cyclic thioimidates having the general formulae

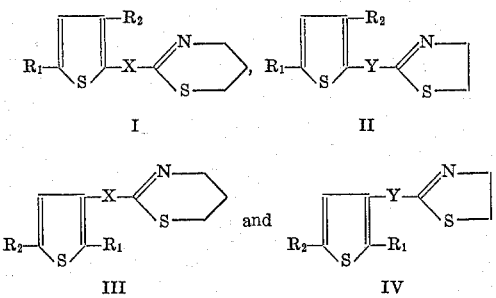

and the non-toxic acid addition salts thereof wherein $R_1$ is selected from the group consisting of hydrogen, chloro and methyl; $R_2$ is selected from the group consisting of hydrogen and methyl; X is selected from the group consisting of vinylene (cis and trans isomers) and straight chain alkylene containing up to three carbon atoms, e.g., methylene, ethylene and trimethylene; and Y is selected from the group consisting of ethylene and vinylene, are surprisingly effective agents in the control, e.g., therapeutic and prophylactic, of helminthiasis in animals, including man, when administered orally or parenterally, and possess favorable therapeutic ratios.

By "non-toxic" acid addition salts is meant those salts which are non-toxic at the dosages administered. The non-toxic acid addition salts of the above mentioned bases which may be employed are the water soluble and water insoluble salts such as the hydrochloride, hydrobromide, phosphate, nitrate, sulfate, acetate, hexafluorophosphate, citrate, gluconate, benzoate, propionate, butyrate, sulfosalicylate, maleate, laurate, malate, fumarate, succinate, oxalate, tartrate, amsonate (4,4'-diaminostilbene-2,2'-disulfonate), pamoate (1,1' - methylene - bis-2-hydroxy-3-naphthoate), stearate, 2-hydroxy-3-naphthoate, p-toluenesulfonate, suramin salt, methiodide, methobromide, methochloride and resin adsorbates. The hexafluorophosphate salts are especially valuable as a means for isolating the novel products of this invention from aqueous mixtures of the free bases or of water soluble acid addition salts. They precipitate out rapidly and quantitatively or almost quantitatively as crystalline products and are easily purified as by washing with water. They thus serve as a means for recovering and purifying these novel cyclic thio-imidates. The free bases are, in turn, easily recovered from the hexafluoro-phosphate salts by neutralization. The solubility of the herein described bases in a given solvent system can, of course, be increased or decreased by judicious choice of the appropriate salt.

Resin adsorbates of the cyclic thioimidates of this invention are conveniently prepared by slurrying an aqueous solution of a water soluble salt of the cyclic thioimidate of choice with a suspension of the sodium form of a cation exchange resin for a sufficient period to permit adsorption of the compound by the resin. Suitable resins are the strong sulfonic acid type cation resins, such as Dowex 50, Amberlite CG-120, Amberlite IR-120, Zeo-Karb 225 (available from the Dow Chemical Co., Rohm & Haas, and the Permutit Co., Std., respectively), all of which are sulfonated styrene divinyl-benzene polymers cross-linked to varying degrees.

Those compounds of this invention wherein X is vinylene (trans) are light sensitive, particularly in solution, and undergo conversion to several products including the cis isomer. They must, therefore, be protected from light by suitable means, e.g., storage in the dark, in brown bottles, dark capsules, etc.

These agents are active against both the mature and immature forms of helminths of the families Ancylostomidae, Oxyuroidae, Ascaridoidea, Taenioidae, Strongyloidae, and Trichostrongylidae. They are especially effective against the gastrointestinal parasites of ruminants (e.g., sheep, cattle, goats) and of non-ruminants such as dogs, cats, swine and horses.

Methods of studying the sensitivity of this group of parasites to chemotherapeutic agents comprise selecting a laboratory-induced parasitic infestation of a laboratory animal exhibiting a similar host-parasite relationship to that found between such parasites and domestic animals. Such a relationship exists between *Nematospiroides dubius* and laboratory mice. The test with *N. dubius* in laboratory mice is carried out by collecting the fecal matter of an infected mouse and suspending it in moist charcoal. Patties are prepared and these are incubated at room temperature for 4 to 5 days until the ova hatch and larvae are produced. The larvae are then collected and used to inoculate healthy mice. It has been found that an inoculum of 40 larvae per mouse yields a flourishing infestation consisting of about 30 adult worms after a 14-day developmental period. Established anthelmintics have been found to be ineffective against an inoculum of this size.

As noted above, these products are effective to a significant degree in controlling, that is, in eliminating and preventing, helminthiasis in animals, including man. The terms "controlling" and "control" as used herein are meant to include the treatment of helminthiasis in animals suffering therefrom and the prevention (prophylaxis) of helminthiasis in animals. Subcutaneous and intramuscular injections are the favored methods of parenteral injection for several reasons; simplicity, convenience and the compounds appear less toxic than when administered intravenously. According to this method of the present invention the anthelmintic agents described herein or their non-toxic acid addition salts are administered parenterally, e.g., by subcutaneous or intramuscular injection, to animals, other than man, suffering from helminthiasis of various types in a dosage equivalent to from about 20 mg. to about 150 mg. of the free base/kg. of body weight. A single injection is generally sufficient, but in the event multiple doses are employed, the injection can be repeated at regular, e.g., monthly, intervals, or more frequently if desired. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume of proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Administration of these anthelmintic agents in combination with hyaluronidase avoids local irritation, increases the rate of absorption of the drug and reduces, if not completely eliminates, the pain due to swelling and distention. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

When administered by the oral route, the preferred route for administering the novel products of this invention, the compounds are given in dosages equivalent to from about 1 mg. to about 150 mg., free base/kg. of body weight. This can be achieved by a number of methods including mixing with the feed, dosage unit formulations such as capsules, tablets, liquid mixtures and solutions including drench solutions, or they can be administered in admixture with minerals such as sodium chloride which are frequently fed to animals as a supplement. Although the dosage specified is based on active ingredient, namely the base form of the cyclic thioimidate, in practical use in the non-toxic acid addition salts specified and the free base can be used interchangeably; except as otherwise noted below. The non-toxic acid addition salts, especially the water insoluble acid addition salts, represent preferred forms of these novel products for the control of helminthiasis in view of their greater therapeutic index relative to that of the free bases and water soluble salts.

For therapeutic use, a dosage equivalent to from about 1 mg. to about 150 mg. of free base/kg. of body weight is recommended. Ordinarily a single dose is sufficient, but in the event multiple doses are employed, this dose is repeated on 2 or 3 consecutive days. Since the present method is effective against not only the mature worms but also against the larval stages, it is not necessary to repeat the dosage after a period of 2 to 3 weeks as is commonly done with prior anthelmintic agents. For administration to sheep, goats, cattle, horses and swine on a therapeutic basis, a drench solution or suspension which is squirted down the animal's throat by a means of a drenching syringe is convenient. For this purpose an aqueous suspension of a water insoluble nontoxic salt is preferred because of the greater therapeutic index of such salts relative to the water soluble non-toxic salts and the free bases. Suspensions having 10% of a water insoluble salt are convenient dosage forms. Of course, suspensions of lesser or greater concentration can be used if desired. Solutions having concentrations ranging from about 3% up to the limit of solubility of the salt in water are satisfactory for drench solutions. More dilute solutions, however, can be supplied for drinking purposes. A 0.1% solution is useful.

For prophylactic use, 5 to 50 mg. (calculated as free base) per kg. of body weight daily is administered. This is the preferred range. Higher dosages can, of course, be used but are not desirable from an economic standpoint. The above methods of administration are suitable although administration in the animal's food, water, or mineral mixture is more convenient.

For human use the oral route of administration is preferred. When used therapeutically, dosages equivalent to from about 2 mg. to about 50 mg. (calculated as free base)/kg. of body weight are recommended. For human prophylactic use from about 1 mg. to about 10 mg. (calculated as free base)/kg. of body weight daily is administered.

Boluses and capsules are also used for the therapeutic treatment of animals. For animals weighing from 30 to 1000 pounds the usual dose, calculated as free base, ranges from ½ to 45 grams. Boluses of suitable sizes containing these materials can be prepared by conventional methods.

Dry mineral mixtures containing the products of this invention are prepared containing from 0.01 to about 10% of the active ingredient mixed with salt (sodium chloride) and other minerals with which it is desired to treat the animal. This can then be fed on an ad libitum basis by adjusting the proportion of active ingredient in the mixture to the average daily consumption per animal so as to provide the proper daily dose as specified above.

If prepared feed supplements are employed, the material can be administered in admixture with the feed. Again, a concentration range of about 0.01 to 10% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 0.01–5%, depending again upon the palatability of the material, are sometimes useful. Additionally, these compounds can be used in micronized form especially when used in emulsions or suspensions by either the oral or parenteral route of administration.

In addition to their outstanding efficacy as anthelmintic agents the compounds of this invention and their acid addition salts are also larvacidal against the aforementioned helminths. Larvae of these familiies, cultured from fecal material of infected sheep, when exposed to aqueous solutions of the herein described compounds or their salts soon become immobilized and die. The greater the concentration of active ingredient, the shorter the time required for immobilization and death. The compounds described herein are, therefore, valuable for preventing infection and re-infection by spraying the areas, e.g., pastures, pens, used by animals. By spraying areas used or to be used by animals prophylaxis is realized and, by administering the drugs to the animals before placing them in such areas, the development of clinical disease is prevented.

The novel products of this invention are prepared by known methods. A convenient and preferred procedure for those compounds wherein X is lower alkylene (methylene, ethylene or trimethylene) and Y is ethylene comprises the condensation of the appropriate w-(thienyl) alkyl nitrile, e.g., 3-(2-thienyl)propionitrile, 3-(3-thienyl) propionitrile, 4 - (2 - thienyl)butyronitrile, 4-(3-thienyl) butyronitrile, with the desired w-mercaptoalkylamine, e.g., 2-mercaptoethylamine, 3-mercaptopropylamine.

The starting w-(thienyl)alkylnitriles are produced by known methods as by dehydration of the corresponding w-(thienyl)alkanoic acid amides, or by a Knoevenagel type condensation of the appropriate thiophene carboxaldehyde with cyanoacetic acid in the presence of an appropriate catalyst. As catalysts for this condensation, nitrogen bases, e.g., ammonia, primary and secondary amines, pyridine, piperidine, triethanolamine, can be used. The favored catalyst system is ammonium acetate-pyridine. The reaction is conducted in a reaction-inert solvent system such as in toluene, benzene, xylene, preferably with continuous removal of by-product water. Additionally, the nitrogenous base can be used as solvent. The reaction is advantageously run at a temperature of from about 80° C. to the reflux temperature of the solvent and preferably at a temperature sufficient to permit removal of the by-product water by azeotropic distillation. The thienylacrylonitriles thus produced are then converted to thienylpropionitriles by catalytic hydrogenation.

The catalytic hydrogenation is conducted with a noble metal catalyst, e.g., palladium, platinum, rhenium, rhodium, osmium, iridium. As solvent system a suitable reaction-inert solvent should be used. Methanol and other alcohols are satisfactory. The system can be neutral, basic or acidic. A neutral to slightly basic system is generally favored. The pressure and temperature appear not to be critical factors. Pressures of up to about 500 p.s.i. afford good yields. Reaction temperatures up to 100° C. can be used. The reaction should be stopped when the theoretical amount of hydrogen is taken up.

In another method the imido ester hydrochlorides, prepared from the desired thienylpropionitriles by known methods, are treated with the appropriate w-mercaptoalkyl amines to produce the corresponding cyclic thioimidate hydrochloride. Alternatively, the imido ester, free base form, is reacted with an alcoholic solution of the w-mercaptoalkyl amine hydrochloride or other acid addition salt. Suitable alcohols are methanol, ethanol, butanol, propanol and 2-propanol. Other solvents such as dioxane, tetrahydrofuran, ethylene glycols can also be used. An excess of the amine can be used as solvent, if desired. For large scale reactions, that is, reactions larger than laboratory scale, the use of a solvent of the type mentioned above is preferred. The reaction is carried out at a temperature of from about −5° C. to 50° C. and preferably at from about −5° C. to about 30° C. until formation of the product is complete or essentially complete. The cyclic thioimidate hydrochloride is recovered, e.g., removal of the solvent and recrystallization of the residue from a suitable solvent system.

Still another method for preparing these compounds involves the cyclization of the appropriate N-(w-hydroxy alkyl) [w-(thienyl)alkanoylamide]; N-(2 - hydroxyethyl)-[3-(2-thienyl)propionamide]; N-(2-hydroxyethyl)-[3-(3-thienyl)propionamide]; N - (3 - hydroxypropyl)-[3-(3-thienyl)propionamide]; N - (3 - hydroxypropyl) - [3-(2-thienyl)propionamide]; N - (2-hydroxyethyl)-[3-(2-thienyl)butyramide]; in the presence of phosphorus pentasulfide. The starting N - (w-hydroxyalkyl) [w-(thienyl) alkanoylamides] are prepared according to known methods of amide formation, e.g., from the appropriate w-(thienyl) propionic acid ester and the proper aminoalkanol under conditions whereby the by-product alcohol is removed.

Those compounds of this invention wherein X and Y are vinylene are readily and conveniently prepared by the direct condensation of the desired thiophene carboxaldehyde with 2-methylthiazoline or 2-methyldihydrothiazine. The reaction is conducted in general at an elevated temperature, that is, at a temperature sufficiently high to remove the by-product water formed. Temperatures of from about 80° C. to about the decomposition point of the reactants and product can be used. It is advantageous to use a reaction-inert solvent, desirably one which forms an azeotrope with water, and temperatures of from about 80° C. to the reflux temperature of the solvent. The compounds thus produced have the trans configuration. The cis isomers can be obtained by irradiation of the trans isomers as described herein.

The hydrochloride salts prepared as described herein can be readily converted to the free base simply by neutralization of the acid portion of the salt by aqueous sodium or potassium hydroxide and the water insoluble free base recovered by mechanical means or by solvent extraction with a suitable immiscible solvent such as ethyl acetate. The free base, isolated by removal of the solvent, can, if desired, be purified by recrystallization from a suitable solvent system or by vacuum distillation. Alternatively, the free bases are obtained by neutralization of an acid salt with sodium methoxide in methanol and recovery of the base by known methods. Other acid addition salts can be readily prepared simply by dissolving the free base in a suitable solvent, e.g., acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner the sulphate, nitrate, phosphate, acetate propionate, butyrate, citrate, gluconate, benzoate, pamoate, amsonate, 2-hydroxy-3-naphthoate and the sulphosalicylate and other salts can be prepared.

The following examples are provided to illustrate in greater detail the manner of practicing the present invention. They are, however, not to be considered as limiting the scope thereof in any way. (The dosages used in the following examples are calculated as the free base.)

EXAMPLE I 3-(2-thienyl)acrylonitrile

A solution of 123.4 g. (1.10 moles) of 2-thiophenecarboxaldehyde, 85.0 g. (1.00 mole) cyanoacetic acid, 3 g. of ammonium acetate, 110 ml. of pyridine, and 200 ml. of toluene is heated under reflux in an apparatus which includes a Dean-Stark moisture trap. Heating is continued for 48 hours during which time the solution becomes very dark. After the heating period is over the solution is allowed to cool and the solvents then evaporated under reduced pressure. The less volatile residue is fractionally distilled through a column packed with porcelain saddles to yield the product which is initially a colorless oil: B.P. 154° C. at 30 mm.; yield, 107.4 g. (79%); $n_D^{25}$ 1.6373.

EXAMPLE II 3-(3-thienyl)acrylonitrile

The procedure of Example I is repeated but substituting 3-thiophenecarboxaldehyde for 2-thiophenecarboxaldehyde to give a 47% yield of the title product; B.P. 134° C. at 14 mm., $n_D^{23}$ 1.6192.

*Analysis.*—Calcd. for $C_7H_5NS$: C, 62.19; H, 3.73; N, 10.36%. Found: C, 61.44; H, 3.95; N, 10.82%.

EXAMPLE III 3-(2-thienyl)propionitrile

A pressure bottle is charged with 67.6 g. (0.5 mole) of 3-(2-thienyl)acrylonitrile, 50 ml. of 1 N sodium hydroxide, 300 ml. of methanol, and 10 g. of 5% palladium-on-carbon catalyst. The pressure bottle is swept free of air by nitrogen and then fitted onto a Paar hydrogenation apparatus. Hydrogenation is conducted in the normal manner until the theoretical amount (0.5 mole) of hydrogen is absorbed. The catalyst is removed by filtration, and the filtrate concentrated to a mixture of an oil and aqueous sodium hydroxide. Water is added to this mixture and the resulting aqueous solution extracted with ether. The ether extract is dried, filtered and evaporated under reduced pressure to a pale yellow oil which is fractionally distilled through a column packed with porcelain saddles to give the product; B.P. 156°–158° C. at 35 mm.; $n_D^{25}$ 1.5372; yield 49.5 g. (72%).

EXAMPLE IV

3-(3-thienyl)propionitrile

The product of Example II, 3-(3-thienyl)acrylonitrile, is subjected to the procedure of Example III to give the title product as a pale yellow oil.

EXAMPLE V

Following the procedures of Examples I and III, the thienyl propionitriles listed below are prepared from the appropriate 2-, or 3-thiophenecarboxaldehydes.

| 3-[3-($R^2$)-5-($R^1$)-(2-thienyl)]-propionitrile | | 3-[2-($R^1$)-5-($R^2$)-(3-thienyl)]-propionitrile | |
|---|---|---|---|
| $R_1$ | $R_2$ | $R_1$ | $R_2$ |
| $CH_3$ | H | $CH_3$ | H |
| Cl | H | Cl | H |
| H | $CH_3$ | H | $CH_3$ |
| $CH_3$ | $CH_3$ | $CH_3$ | $CH_3$ |
| Cl | $CH_3$ | Cl | $CH_3$ |

Example VI

Ethyl 3-(2-thienyl)propionimidate hydrochloride

A solution of 162.4 g. (1.18 moles) of 3-(2-thienyl)-propionitrile in 60.0 g. (1.3 moles) dry ethanol and 360 ml. of dry ether is saturated with hydrogen chloride while the temperature is maintained at below 10° C. After three hours the yellow orange solution is saturated and then stirred at ambient temperature overnight under a dry nitrogen atmosphere. Sufficient ether is lost during this time to produce a solid cake in the reaction flask, which is broken up by the addition of fresh ether. The product is collected, washed thoroughly with ether and dried at room temperature for three hours, to give 224 g. (86% yield) of product melting at 122°–124° C. The product is stored under nitrogen in the refrigerator.

Repetition of this procedure but replacing ethanol by methanol, n-propanol or n-butanol produces the corresponding alkyl-3-(2-thienyl)propionimidate hydrochloride.

EXAMPLE VII

The procedure of Example VI is applied to the thienyl propionitriles of Examples IV and V to produce the corresponding alkyl thienyl propionimidate hydrochlorides.

EXAMPLE VIII

Methyl 3-(2-thienyl)propionate

Method A.—A solution of 70.4 g. (0.45 mole) of 3-(2-thienyl) propionic acid, and 400 ml. of anhydrous methanol containing 12 g. (0.34 mole) of anhydrous hydrogen chloride is allowed to stand at room temperature for 48 hours. The solution is then evaporated under reduced pressure to an oil which is distilled, yielding the pure products; yield 63 g. (82%); B.P. 103° C. at 10 mm.; $n_D^{24}$ 1.5121; $d_{24}^{24}$ 1.5121; $d_{24}^{24}$ 1.1412.

Analysis.—Calcd. for $C_8H_{10}O_2S$: C, 56.44; H, 5.92%. Found: C, 56.62; H, 5.90%.

By means of this procedure the following thienyl alkanoic acids are converted to their methyl esters:

2-thienylacetic acid
3-thienylacetic acid
3-(2,5-dimethyl-3-thienyl)propionic acid
4-(2-thienyl)butanoic acid
4-(2,5-dimethyl-3-thienyl)butanoic acid Method B.—Methyl 3-(2-thienyl)propionimidate hydrochloride, 10.4 g., (0.05 mole) is mixed with 50 ml. of water and 50 ml. of diethylether and the mixture stirred at room temperature for 3 days. The ether phase is separated, dried over anhydrous sodium sulfate, filtered and evaporated to an oil which is distilled to give the desired ester.

The thienyl propionimidates of Example VII are likewise converted to the corresponding methyl esters.

EXAMPLE IX

5,6-dihydro-2-methly-4H-1,3-thiazine

Essentially, the procedure of F. M. Hamer and R. J. Rathbone (J. Chem. Soc., 243–9 (1943)) is followed. A mixture of 65 g. (1.14 moles) of acetic acid and 77 g. (1.03 moles) of 3-amino-1-propanol is heated cautiously to 200° C. to form crude N-(3-hydroxypropyl)-acetamide, and to drive off the by-product water. The crude amide (59 g., 0.5 mole) is placed in a Claisen distilling apparatus, heated to approximately 150° C. and then treated with 24 g. (0.11 mole) of phosphorus pentasulfide in small portions. When the addition is complete the volatile products are distilled from the mixture at 5–15 mm. Hg pressure. The distillate boiling up to 140° C. is collected, and then fractionally redistilled. The desired product, 5,6-dihydro-2-methyl-4H-1,3-thiazine, is collected in the fraction, boiling point 62° C./13 mm. Hg: yield 24 g. (42%); $n_D^{24}$ 1.5295.

The hydrochloride salt is prepared by dissolving 11.5 (0.1 mole) of the base in 100 ml. of benzene and treating the resulting solution with 37 ml. (0.11 mole) of 3 N anhydrous hydrogen chloride in anhydrous methanol. The volatiles are removed under reduced pressure, and the white solid residue recrystallized from hot acetone plus just enough methanol to effect solution: yield 8 g. (53%); M.P. 183°–185° C.

Analysis.—Calcd. for $C_5H_{10}ClNS$: C, 39.59; H, 6.64; N, 9.23%. Found: C, 39.82; H, 6.59; N, 9.14%.

EXAMPLE X

5,6-dihydro-2[2-(2-thienyl)ethyl]-4H-1,3-thiazine

A mixture of 63 g. (0.37 mole) of methyl 3-(2-thienyl) propionate and 30 g. (0.40 mole) of 3-amino-1-propanol is heated slowly to 200° C. to form crude N-(3-hydroxypropyl)-[3-(2-thienyl)propionamide], and to drive off by-product methanol. The crude amide is placed in a Claisen distillation apparatus and treated with 19.5 g. of phosphorus pentasulfide. The mixture is warmed to start the reaction and, after most of the foaming subsides, residual gases are removed by evacuating the flask under vacuum. The distillation flask is heated slowly to 200° C. and the distillate boiling up to 130° C. at 0.3 mm. Hg pressure collected. This material is redistilled through an efficient fractionating column to afford 5,6-dihydro-2-[2-(2-thienyl)ethyl]-4H-1,3-thiazine of high purity. B.P. 98° C. at 0.09 mm. Hg pressure, $n_D^{24}$ 1.5925.

Analysis.—Calcd. for $C_{10}H_{13}NS_2$: C, 56.83; H, 6.20; N, 6.63%. Found: C, 56.79; H, 6.07; N, 6.45%.

The pamoate salt is prepared by stirring an equimolar mixture of the base and pamoic acid in absolute ethanol for 2 hours. The salt is filtered and air dried; M.P. 260°–270° C. (dec.). The composition corresponds to a 1:1 salt.

Analysis.—Calcd. for $C_{33}H_{29}NO_6S_2$: C, 66.09; H, 4.87; N, 2.34%. Found: C, 65.83; H, 4.80; N, 2.01%.

The hexafluorophosphate salt is prepared by treating a mixture of 10 ml. of 65% hexafluorophosphoric acid in 50 ml. of ice and water with 4.2 g. (0.02 mole) of the base. When the ice melts the salt is filtered, washed with water and air dried. The product is purified by recrystallization from warm 2-propanol. If an oil rather than crystals begin to separate on cooling, sufficient methanol to just dissolve the oil is added. M.P. 129°–130° C. Analysis.—Calcd. for $C_{10}H_{14}F_6NPS_2$: C, 33.61; H, 3.95; N, 3.92%. Found: C, 33.67; H, 3.99; N, 3.83%.

By means of these procedures the following compounds and their pamoate and hexafluorophosphate salts are prepared from the appropriate thienylalkanoic acid methyl ester and the proper w-aminoalkanol. For convenience, the brackets in the following tabulation indicate that for the given value of X, compounds having the $R_1$ and $R_2$ values enclosed by the bracket are prepared by this procedure.

| $R_1$ | $R_2$ | X |
|---|---|---|
| H | H | —CH$_2$— |
| H | H | —CH$_2$CH$_2$CH$_2$— |
| CH$_3$ | H | |
| Cl | H | —CH$_2$— |
| H | CH$_3$ | —CH$_2$CH$_2$— |
| CH$_3$ | CH$_3$ | —CH$_2$CH$_2$CH$_2$— |
| Cl | CH$_3$ | |

| $R_1$ | $R_2$ | Y |
|---|---|---|
| H | H | —CH$_2$CH$_2$— |
| CH$_3$ | H | —CH$_2$CH$_2$— |
| Cl | H | —CH$_2$CH$_2$— |
| N | CH$_3$ | —CH$_2$CH$_2$— |

| $R_1$ | $R_2$ | X |
|---|---|---|
| H | H | —CH$_2$— |
| CH$_3$ | CH$_3$ | —CH$_2$— |
| Cl | CH$_3$ | —CH$_2$— |
| CH$_3$ | H | —CH$_2$— |
| H | H | —CH$_2$CH$_2$— |
| CH$_3$ | CH$_3$ | —CH$_2$CH$_2$— |
| Cl | H | —CH$_2$CH$_2$— |
| H | CH$_3$ | —CH$_2$CH$_2$— |
| Cl | CH$_3$ | —CH$_2$CH$_2$— |
| H | H | —CH$_2$CH$_2$CH$_2$— |
| CH$_3$ | CH$_3$ | —CH$_2$CH$_2$CH$_2$— |
| Cl | H | —CH$_2$CH$_2$CH$_2$— |

| $R_1$ | $R_2$ | Y |
|---|---|---|
| H | H | —CH$_2$CH$_2$— |
| H | Cl | —CH$_2$CH$_2$— |
| CH$_3$ | CH$_3$ | —CH$_2$CH$_2$— |
| H | CH$_3$ | —CH$_2$CH$_2$— |

EXAMPLE XI

2-[2-(2-thienyl)ethyl]-2-thiazoline

A mixture of 13.7 g. (0.1 mole) of 3-(2-thienyl)propionitrile, 12.1 g. (0.107 mole) of 2-mercaptoethylamine hydrochloride, 10.7 g. (0.107 mole) of triethylamine, and 10 ml. of absolute ethanol is heated under reflux for 1 hour, after which time ammonia is no longer evolved. The mixture is allowed to cool to room temperature and then poured into 250 ml. of cold water. The aqueous mixture is made basic with potassium hydroxide, and the oil which separates extracted several times with ether. The combined ether extracts are dried over anhydrous sodium sulfate, filtered and evaporated to give an oil which is fractionally distilled several times to furnish a pure sample of 2-[2-(2-thienyl)ethyl]-2-thiazoline: B.P. 175° C. at 17 mm. mercury pressure $m_D^{24}$ 1.5926.

*Analysis.*—Calcd. for $C_9H_{11}NS_2$: C, 54.78; H, 5.62; N, 7.10%. Found: C, 54.95; H, 5.35; N, 7.15%.

Application of this procedure to the thienyl propionitriles of Examples IV and V produces the corresponding thiazolines. Substitution of 3-mercaptopropylamine for 2-mercaptoethylamine in this procedure affords the corresponding thiazines.

EXAMPLE XII 5,6-dihydro-2-(2-thenyl)-4H-1,3-thiazine hydrochloride

Into a solution of 2-thiopheneacetonitrile (12.3 g., 0.1 mole) in 60 ml. of methanol contained in a pressure bottle ammonia gas is passed until a weight gain of 6 g. is observed. The mixture is next treated with hydrogen sulfide gas until a weight gain of 12 g. is observed. The pressure bottle is then tightly stoppered and heated at 70°–80° C. for one hour. Upon cooling to room temperature the solution is evaporated under reduced pressure to furnish thio-2-thiopheneacetamide as an oily residue which slowly crystallizes. The crude product may be used without further purification in the next step. If further purification is desired it may be recrystallized from benzene or benzene and hexane. An intimate mixture of thio-2-thiopheneacetamide (15.7 g., 0.1 mole) and 3-bromopropylamine hydrobromide (21.9 g., 0.1 mole) heated at 150°–170° C. for 10–20 minutes, is cooled and the mixture is partitioned between ether and dilute aqueous hydrochloride acid. The aqueous phase is cooled in an ice bath, treated with fresh ether and, with vigorous stirring, aqueous sodium hydroxide is added until pH 10–11 is attained. The ether phase is separated, dried over anhydrous sodium sulfate, filtered, and evaporated to afford an oil which is fractionally distilled. The product in the boiling range of 95°–110° C. at 0.2 mm. is the free base, 5,6-dihydro-2-(2-thenyl)-4H-1,3-thiazine.

A solution of the free base (4 g., 0.02 mole) in 20 ml. dry benzene is treated with 7 ml. of 3 N hydrogen chloride in methanol. The resulting solution is evaporated under reduced pressure to afford a yellow solid. Two recrystallizations from acetone give colorless crystals of the pure hydrochloride: yield 1.1 g.; M.P. 132°–133° C.

*Analysis.*—Calcd. for $C_9H_{11}NS_2 \cdot HCl$: C, 46.23; H, 5.17; N, 5.99%. Found: C, 46.39; H, 5.09; N, 5.95%.

By means of this procedure the following compounds as their HCl salts are prepared from the appropriate thiopheneacetonitrile:

5,6-dihydro-2-(3-methyl-2-thenyl)-4H-1,3-thiazine
5,6-dihydro-2-(5-methyl-2-thenyl)-4H-1,3-thiazine
5,6-dihydro-2-(5-chloro-2-thenyl)-4H-1,3-thiazine
5,6-dihydro-2-(3-thenyl)-4H-1,3-thiazine
5,6-dihydro-2-(2,5-dimethyl-3-thenyl)-4H-1,3-thiazine
5,6-dihydro-2-(2-chloro-3-thenyl)-4H-1,3-thiazine
5,6-dihydro-2-(2-methyl-3-thenyl)-4H-1,3-thiazine

EXAMPLE XIII

Trans-5,6-dihydro-2-[2-(2-thienyl)vinyl]-4H-1,3-thiazine

A solution of 115.2 g. (1.00 mole) of 5,6-dihydro-2-methyl-4H-1,3-thiazine, 112.2 g. (1.00 mole) of 2-thiophene carboxaldehyde, and 400 ml. of toluene is heated to reflux in an apparatus which includes a Dean-Stark moisture trap until 17 ml. of water is collected. The solution is then allowed to cool, and the more volatile components evaporated under reduced pressure. The residual oil is taken up in 150 ml. of ethanol, and the resulting solution divided into two equal portions.

One portion is poured into a mixture of 125 g. (0.55 mole) of 65% hexafluorophosphoric acid, and 375 g. of ice to give a yellow gummy precipitate which gradually crystallizes when the mixture is stirred continually. The mixture is filtered, the sloid residue recrystallized twice from methanol to furnish trans-5,6-dihydro-2-[2 - (2 - thienyl)-vinyl]-4H-1,3-thiazine hexafluorophosphate as bright yellow crystals: yield 73 g. (41%); M.P. 190°–192° C.

*Analysis.*—Calcd. for $C_{10}H_{12}F_6NPS_2$: C, 33.80; H, 3.41; N, 3.94%. Found: C, 33.82; H, 3.43; N, 3.81%.

The other portion of crude base in ethanol is added dropwise to a hot solution of 58.0 g. (0.5 mole) of fumaric acid in methanol to give a yellow precipitate. The mixture is cooled to room temperature, the salt filtered and recrystallized from methanol to give pure trans-5,6-dihydro-2-[2-(2-thienyl)vinyl]-4H-1,3-thiazine fumarate as bright yellow crystals: yield 75 g. (46%); M.P. 169°–171° C.

*Analysis.*—Calcd. for $C_{14}H_{15}NO_4S_2$: C, 51.67; H, 4.65; N, 4.31%. Found: C, 51.45; H, 4.65; N, 4.09%.

The free base form of 5,6-dihydro-2-[2-(2-thienyl) vinyl]-4H-1,3-thiazine is produced as follows. A vigorously stirred mixture of 12.1 g. (0.034 mole) of the hexafluorophosphoric acid salt, 50 ml. of 2 N sodium hydroxide, 50 ml. of water and 100 ml. of diethyl ether is cooled in an ice bath. When the final traces of solid material have disappeared, the ether phase is separated, dried over anhydrous sodium sulfate, filtered, and evaporated to furnish a crystalline residue, M.P. 55°–58° C. This material is recrystallized from hexane (a small amount of insoluble material is filtered off) to furnish crystals, M.P. 59°–60° C. One more recrystallization from hexane plus a little benzene affords analytically pure base as colorless crystals, M.P. 60°–61° C.

*Analysis.*—Calcd. for $C_{10}H_{11}NS_2$: C, 57.38; H, 5.30; N, 6.69%. Found: C, 57.52; H, 5.18; N, 6.60%.

The hydrochloride salt is prepared by cooling a solution of 4.2 g. (0.02 mole) of the crude base, 20 ml. of acetone, and 8 ml. of 3.4 N hydrogen chloride in anhydrous methanol to 5° C. to yield bright yellow prisms of 5,6-dihydro-2-[2-(2-thienyl)vinyl] - 4H - 1,3 - thiazine hydrochloride monohydrate: M.P. 177°–182° C.

*Analysis.*—Calcd. for $C_{10}H_{14}ClNOS_2$: C, 45.53; H, 5.35; N, 5.31%. Found: C, 45.65; H, 5.26; N, 5.17%.

In other preparations, particularly those on larger scale, it is noticed that along with prisms of the monohydrate salt needles of the anhydrous salt are also formed.

A mixture of 38.8 g. (0.1 mole) of pamoic acid, 24.6 g. (0.1 mole) of 5,6-dihydro-2[2-(2-thienyl)vinyl]-4H-1,3-thiazine hydrochloride, 600 ml. of absolute ethanol, and 4.0 g. of sodium hydroxide are stirred at room temperature for 16 hours. The bright yellow crystalline product is filtered, slurried in water for 10 minutes, filtered again and dried in vacuo: M.P. 228.5°–230.5° C.

*Analysis.*—Calcd. for $C_{33}H_{27}NO_6S_2$: C, 66.31; H, 4.55; N, 2.34%. Found: C, 66.45; H, 4.55; N, 2.02%.

EXAMPLE XIV

By means of the procedures of Example XIII the following compounds and their fumarate, hexafluorophosphate, hydrochloride and pamoate salts are obtained by the condensation of the appropriate thiophene carboxaldehyde with 5,6-dihydro-2-methyl-4H-1,3-thiazine or 2-methyl-2-thiazoline.

5,6-dihydro-2[2-(2-chloro-3-thienyl)vinyl]-4H-1,3-thiazine
5,6-dihydro-2[2-(5methyl-3-thienyl)vinyl]-4H-1,3-thiazine
2-[2-(2-thienyl)vinyl]-2-thiazoline
2-[2-(5-methyl-2-thienyl)vinyl]-2-thiazoline
2-[2-(5-chloro-2-thienyl)vinyl]-2-thiazoline
2-[2-(3-methyl-2-thienyl)vinyl]-2-thiazoline
2-[2-(3-thienyl)-vinyl]-2-thiazoline
2-[2-(2,5-dimethyl-3-thienyl)vinyl]-2-thiazoline
2-[2-(5-methyl-3-thienyl)vinyl]-2-thiazoline
5,6-dihydro-2-[2-(5-methyl-2-thienyl)vinyl]-4H-1,3-thiazine
5,6-dihydro-2-[2-(5-chloro-2-thienyl)vinyl]-4H-1,3-thiazine
5,6-dihydro-2-[2-(3-methyl-2-thienyl)vinyl]-4H-1,3-thiazine
5,6-dihydro-2-[2-(3-thienyl)vinyl]-4H-1,3-thiazine
5,6-dihydro-2-[2-(2,5-dimethyl-3-thienyl)vinyl]-4H-1,3-thiazine
5,6-dihydro-2-[2-(2-methyl-3-thienyl)vinyl]-4H-1,3-thiazine

EXAMPLE XV cis-5,6-dihydro-2-[2-(2-thienyl)vinyl]-4H-1,3-thiazine

A stirred solution of trans-5,6-dihydro-2-[2-(2-thienyl)vinyl]-4H-1,3-thiazine (3.0 g.) in 300 ml. of benzene is irradiated under an atmosphere of nitrogen by a 550 watt Hanovia high pressure quartz lamp for 15 hours. The benzene is evaporated under reduced pressure and the residue extracted with 30 ml. of hexane. The hexane insoluble portion is the unconverted trans isomer. The hexane extract is evaporated to afford a residue which is taken up in 25 ml. of 2 N hydrochloric acid; insoluble matter was filtered. The aqueous acid solution is filtered then treated with 3 ml. of 65% hexafluorophosphoric acid to give the cis isomer as its crystalline hexafluorophosphoric acid salt. The cis isomer is characterized by its nuclear magnetic resonance spectrum taken in dimethylsulfoxide-$d_6$: the cis isomer shows a doublet in the olefinic hydrogen region with a coupling constant of about 12 c.p.s.; the trans isomer has a doublet with a coupling constant of about 16 c.p.s.

The remaining products of Example XIII are converted to their respective cis isomers by this procedure.

EXAMPLE XVI 5,6-dihydro-3-methyl-2-[2-(2-thienyl)ethyl]-4H-1,3-thiazinylium iodide A solution of 5,6-dihydro-2-[2-(2-thienyl)ethyl]-4H-1,3-thiazine (10.6 g., 0.05 mole), 50 ml. of methanol and 3.5 ml. (8.0 g., 0.056 mole) of iodomethane is allowed to stand at room temperature for six days. The solvent is then evaporated to afford an oil which crystallizes on standing. The product is recrystallized from 2-propanol: methanol (10:1) twice to give 10.0 g. (57%) of pure methiodide salt: M.P. 121°–122.5° C.

*Analysis.*—Calcd. for $C_{11}H_{16}INS_2$: C, 37.39; H, 4.57; N, 3.97%. Found: C, 37.48; H, 4.56; N, 3.83%.

Substitution of bromomethane and chloromethane for iodomethane in the above procedure produces the corresponding methobromide and methochloride salts.

EXAMPLE XVII

Methyl-5-methyl-3-thiophenecarboxylate

A solution of 5-methyl-3-thiophenecarboxylic acid (14.2 g., 0.1 mole) and anhydrous methanol containing approximately 1% hydrogen chloride is allowed to stand at room temperature for 48 hours. The solvent is then evaporated under reduced pressure and the residue fractionally distilled to afford the pure ester.

In like manner 3-methyl-2-thiophenecarboxylic acid is converted to its corresponding methyl ester.

EXAMPLE XVIII

Methyl 2-chloro-5-methyl-3-thiophenecarboxylate

To methyl 5-methyl-3-thiophenecarboxylate (15.6 g., 0.1 mole) there is added dropwise with efficient stirring (14 g., 0.1 mole) of sulfuryl chloride. A spontaneous rise in temperature is noted. The temperature is maintained at 120° C. for an hour then fractionally distilled to afford the pure chloro-ester.

In like manner methyl 3-methyl-2-thiophenecarboxylate is transformed into methyl 5-chloro-3-methyl-2-thiophenecarboxylate.

EXAMPLE XIX 5-methyl-3-thiophenecarboxaldehyde

A solution of methyl 5-methyl-3-thiophenecarboxylate (15.6 g., 0.1 mole) and 75 ml. of anhydrous diethyl ether is cooled to −70° C. by means of a Dry Ice/acetone bath. With efficient stirring 71 g. (0.1 mole) of a commercial 20% solution of diisobutyl aluminum hydride (Dibal-H, Texas Alkyls, Inc.) in toluene is added dropwise over a period of 30 minutes. The reaction mixture is maintained at −70° C. for 60 more minutes, then allowed to warm to room temperature. Water (18 g., 1.0 mole) is added dropwise with stirring to the reaction mixture to transform the complex aluminum salts into filterable aluminum oxides. The mixture is then filtered and the filtrate evaporated under reduced pressure. The residue is fractionally distilled through an efficient column to afford the pure aldehyde.

In like manner methyl 2-chloro-5-methyl-3-thiophenecarboxylate and methyl 5-chloro-3-methyl-2-thiophenecarboxylate are converted to 2-chloro-5-methyl-3-thiophenecarboxaldehyde and 5-chloro-3-methyl-2-thiophenecarboxaldehyde, respectively.

EXAMPLE XX

The free base forms of the products of Examples X–XIII and XV are converted to acid addition salts by treatment with an equimolar proportion of the appropriate acid in methanol as solvent. The salts are recovered by filtration, by precipitation with a non-solvent, e.g., ether, hexane, or, alternatively, if desired, by evaporation of the solvent. The following acid addition salts are thus prepared: p-toluenesulfonate, hexafluorophosphate, amsonate, 2-hydroxy-3-naphthoate, stearate, citrate, gluconate, benzoate, acetate, propionate, butyrate, sulfate, nitrate, phosphate, hydrobromide t-butylacetate, trimethylacetate, oxalate, succinate, malate and tartrate.

Application of the procedure of Example XVI to the base forms of the Examples X–XIII and XV products affords the methiodide, methobromide and methochloride salts.

EXAMPLE XXI

The hydrochloride salt of 5,6-dihydro-2-[2-(2-thienyl)ethyl]-4H-1,3-thiazine (5.0 g.) is dissolved in water (30 ml.) and the solution added to a well-stirred suspension of Amberlite CG-120 (sodium form of a cation exchange resin) (5.9 g.) in 100 ml. water. The mixture is stirred for 3 hours, filtered, washed with water and dried in vacuo.

Resin adsorbates of the products of Examples X–XIII and XV are prepared in like manner.

EXAMPLE XXII

Tablets and boluses

A convenient tablet size is one containing 250 mg., calculated as the free base, of the drug. Such tablets can be prepared by thoroughly blending 250 g., calculated as the free base, of 2-[2-(2-thienyl)ethyl]-2-thiazoline hydrochloride or the equivalent weight of other compounds within the scope of this invention and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from ½ to 45 g. per day depending again upon the body weight of the animals. Boluses of various sizes can be prepared in the same fashion by simply selecting a die of appropriate size.

EXAMPLE XXIII

Capsules

The products of this invention and their acid addition salts can be conveniently encapsulated in hard gelatin capsules. For therapeutic and prophylactic purposes, from about 250 mg. to 1 gram of these agents (calculated as the free base) can be contained in a single capsule. It is convenient to mix the active ingredient with a solid diluent, for instance, calcium phosphate. From about 15 to 50% the weight of drug of tricalcium phosphate is employed. Thus, a hard gelatin capsule can be prepared by thoroughly blending two parts by weight of 2-[2-(2-thienyl)ethyl]-5,6-dihydro-4H-1,3-thiazine pamoate and calcium phosphate in a twin shell blender. The powder is then subdivided, and loaded into hard gelatin capsules in such a fashion that each capsule contains the equivalent of 250 mg. active ingredient as the free base.

EXAMPLE XXIV

Mineral mixture

Such a mixture can be conveniently made by mixing 2-[2-(2-thienyl)vinyl]-2-thiazoline fumarate, equivalent to 1 part by weight of free base, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animals.

In like manner mineral mixtures of the other products within the ambit of this invention can be prepared.

EXAMPLE XXV

Feed mixture

Prophylactic uses of these products can be properly accomplished by adding the agent to a feed mixture. The usual prophylactic dose is from about 2.5 to 25 g. (calculated as free base) daily for 1000-pound cattle. Assuming such animal consumes 10 lbs. of feed supplement per day, at least 10 lbs. of the chosen agent per ton would be incorporated. Depending upon the feed consumption of the animal and the dosage employed, the proportion of agent in the feed varies from 0.005% up to about 0.10% on a weight basis.

EXAMPLE XXVI

Lambs naturally infected with gastrointestinal helminths can be cleared to a significant degree by the subcutaneous administration of 2-[2-(2-thienyl)ethyl]-2-thiazoline hydrochloride at levels of from about 20 mg./kg. to about 150 mg./kg. The local edema which frequently accompanies the injection can be prevented or at least minimized by the simultaneous administration of about 150 units (U.S.P.) of hyaluronidase.

Similarly, the other products of this invention can be used for the control of helminthic infection.

EXAMPLE XXVII

The larvacidal activity of 2-[2-(2-thienyl)ethyl]-5,6-dihydro-4H-1,3-thiazine hydrochloride against larvae of Haemonchus, Trichostrongylus and Strongyloides cultured from the fecal material of sheep is determined as follows:

Fecal material is cultured at 23° C., the filariform larvae removed, placed in a saline solution and counted by the dilution method. Approximately 1000 larvae are then placed on watch glasses to which various concentrations of anthelmintic agent are added (0.1%–20%). The final volume of solution is 10 ml. in each case. The mixing of larvae and anthelmintic agent is done under a dissecting microscope and the immobilization time and actual death time noted.

The filariform larvae have a rather fast undulating motion. Upon addition of the anthelmintic-containing solution the larvae lose their progressive undulating motion but continue to exhibit slow local undulations. The thus immobilized larvae soon die. The higher concentrations, as expected, are exceptionally rapid in their larvacidal action. The remaining products of this invention exhibit similar larvacidal action.

EXAMPLE XXVIII

A pen previously occupied for two weeks by two sheep naturally infested with digestive Strongyles is sprayed with a 20% aqueous solution of 2-[2-(2-thienyl)ethyl]-2-thiazoline hydrochloride at the rate of 0.5 gallon per 1000 square feet after removal of the infected sheep. The following day two nematode-free sheep are placed in the enclosure. Daily checks of their feces for two weeks followed by post-mortem examination showed no nematode infestation.

EXAMPLE XXIX

The effect of 2-[2-(2-thienyl)ethyl]-5,6-dihydro-4H-1,3-thiazine pamoate against the migratory phases of *Ascaris suum* is determined as follows.

Fifteen pigs about five weeks old are divided into three groups of five.

Group 1.—Non-infected, non-medicated;
Group 2.—Laboratory infected with *Ascaris suum*, non-medicated;
Group 3.—Laboratory infected with *Ascaris suum*, medicated with the above drug beginning 2 days before infection and continuing for 5 days after infection. The drug is administered orally at 50 mg./kg. body weight.

The test animals are infected with $4 \times 10^5$ embryonated *Ascaris suum* ova using a stomach tube. All animals are sacrificed 8 days after the infection and the livers and lungs inspected for characteristic lesions and the number of larvae present.

The drug is thus found to be highly effective in protecting pigs against *Ascaris suum* infection. The infected, but non-medicated, animals developed thumping and their livers and lungs are covered with innumerable mottling lesions and petechial hemorrhages. The infected but medicated animals show no abnormal clinical signs during the experiment. Their livers show some mottling lesions. However, similar lesions appeared in the non-infected, non-medicated animals indicating they contained some natural *Ascaris suum* infection.

Similar protection is provided by the remaining compounds of this invention.

What is claimed is:

1. A compound selected from the group consisting of those having the formulae

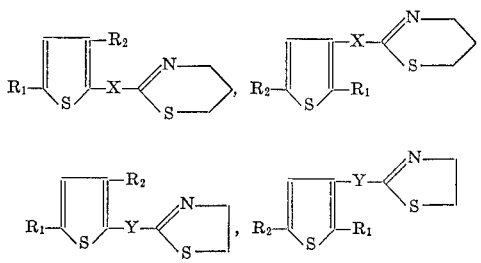

and the non-toxic acid addition salts thereof wherein $R_1$ is selected from the group consisting of hydrogen, methyl and chloro;

$R_2$ is selected from the group consisting of hydrogen and methyl;

X is selected from the group consisting of vinylene and straight chain alkylene containing up to three carbon atoms; and Y is selected from the group consisting of ethylene and vinylene.

2. The compound represented by the formula

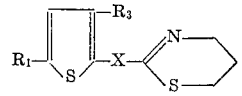

wherein each of $R_1$ and $R_2$ is hydrogen and X is straight chain alkylene containing up to three carbon atoms.

3. 5,6 - dihydro - 2-(2-thenyl)-4H-1,3-thiazine hydrochloride.

4. 5,6 - dihydro-2-[2-(2-thienyl)ethyl]-4H-1,3-thiazine pamoate.

5. 5,6 - dihydro - 2 - [3-(2-thienyl)propyl]-4H-1,3-thiazine hexafluorophosphate.

6. 5,6 - dihydro - 2 - [2-(2-thienyl)vinyl]-4H-1,3-thiazine fumarate.

7. 5,6 - dihydro-2-[2-(3-methyl-2-thienyl)vinyl] - 4H-1,3-thiazine hexafluorophosphate.

8. 2-[2-(2-thienyl)ethyl]-2-thiazoline.

9. 2-[2-(3-thienyl)ethyl]-2-thiazoline citrate.

10. 2-[2-(2-thienyl)vinyl]-2-thiazoline.

11. 2-[2-(2,5-dimethyl-3-thienyl)vinyl] - 2 - thiazoline p-toluenesulfonate.

12. 5,6-dihydro-3-methyl - 2 - [2-(2-thienyl)ethyl]-4H-1,3-thiazinylium iodide.

13. 5,6 - dihydro-2[2-(3-methyl-2-thienyl)ethyl] - 4H-1,3-thiazine pamoate.

References Cited
UNITED STATES PATENTS 2,561,245  7/1951  Thompson et al. ____ 260—306.7
2,563,401  8/1951  Emerson et al. _____ 260—302

JOHN D. RANDOLPH, *Primary Examiner.*

JULIAN S. LEVITT, WALTER A. MODANCE,
*Examiners.*

J. M. FORD, S. FRIEDMAN, *Assistant Examiners.*